US012617235B2

(12) United States Patent
Terrasi et al.

(10) Patent No.: US 12,617,235 B2
(45) Date of Patent: May 5, 2026

(54) HIGH EFFICIENCY MODULAR CARTER ASSEMBLED COAXIALLY TO EXISTING HOLES

(71) Applicant: DANA ITALIA S.R.L., Arco (IT)

(72) Inventors: Gianluca Terrasi, Dro (IT); Davide Deimechei, Trento (IT); Andrea Bortoli, Trento (IT); Marco Scopesi, Isera (IT); Viviana Enei, Trento (IT)

(73) Assignee: DANA ITALIA S.R.L., Arco (IT)

( * ) Notice: Subject to any disclaimer, the term of this patent is extended or adjusted under 35 U.S.C. 154(b) by 346 days.

(21) Appl. No.: 18/463,759

(22) Filed: Sep. 8, 2023

(65) Prior Publication Data

US 2025/0083474 A1      Mar. 13, 2025

(51) Int. Cl.
*B60B 35/16*      (2006.01)
*F16H 57/04*      (2010.01)

(52) U.S. Cl.
CPC ......... *B60B 35/16* (2013.01); *F16H 57/0409* (2013.01); *B60B 2900/561* (2013.01)

(58) Field of Classification Search
CPC .... B60B 35/16; B60B 35/166; F16H 57/0409
See application file for complete search history.

(56) References Cited

U.S. PATENT DOCUMENTS

| | | | | |
|---|---|---|---|---|
| 5,297,855 | A * | 3/1994 | Jeng | B60B 35/16 301/124.1 |
| 8,021,259 | B2 * | 9/2011 | Hilker | F16H 57/0427 184/88.1 |
| 9,249,873 | B2 * | 2/2016 | Pump | F16H 48/08 |
| 9,568,091 | B2 | 2/2017 | Drill et al. | |
| 2008/0079308 | A1 * | 4/2008 | Kretschmer | B60B 35/16 301/124.1 |
| 2025/0198501 | A1 * | 6/2025 | Dallapiccola | F16H 57/0423 |

FOREIGN PATENT DOCUMENTS

CN          114811013 A      7/2022

* cited by examiner

*Primary Examiner* — Jason R Bellinger
(74) *Attorney, Agent, or Firm* — McCoy Russell LLP

(57)          ABSTRACT

An axle including a central housing, an axle arm fastened to the central housing via multiple first fasteners, and an oil baffle fixed to the central housing via at least one fastening element that is coaxial with at least one fastener from the multiple first fasteners and at least one hole from multiple pre-existing holes of the central housing.

20 Claims, 8 Drawing Sheets

HIGH EFFICIENCY MODULAR CARTER ASSEMBLED COAXIALLY TO EXISTING HOLES

TECHNICAL FIELD

A modular carter for an axle assembly incorporating a first fastening system or a second fastening system. The first and second fastening system may be installed coaxially with existing fasteners and holes of the housing for the axle assembly, such that the modular carter may be mounted to a housing of the axle assembly.

BACKGROUND AND SUMMARY

Vehicles, such as off-highway vehicles, may have axles of a driveline architecture comprising two reduction stages. There may be a first reduction stage comprising a bevel set gear ratio. There may be a second reduction stage comprising a planetary gear train. The reduction stages may be incorporated or rotationally coupled to portions of an axle assembly, such as a differential gear assembly. A first axle assembly may incorporate a first differential housing, which may be a central housing that may house a differential gear assembly. A second axle assembly may incorporate a second differential housing, which may be a central housing, that may house a differential gear assembly. The differential gear assemblies of the first and/or second differential housings may comprise the bevel gear ratio. The differential gear assemblies of the first and/or second differential housings may comprise the planetary gear train. The first and second axle assemblies may incorporate axle half shaft housing that may be fastened to their respective first and second differential housings. At least one of the housings for an axle half shaft may be fastened to the first differential housing via fasteners and complementary holes of the first differential housing and the axle half shaft housing. Likewise, at least one of the housings for an axle half shaft may be fastened to the second differential housing via fasteners and complementary holes of the first differential housing and the axle half shaft housing. There the differential housings may comprise a plurality of first complementary holes and the axle half shaft housings may incorporate a plurality of second complementary holes for the fasteners. Power losses may be increasingly important to reduce in an off-highway vehicle, especially as fuel/energy efficiency becomes more prioritized. Splashing or churning of a fluid, such as lubricant, that may fill or partially fill the volumes of the axle assembly housing may cause power losses that reduce efficiency. The fluid may be splashed or churned via rotational elements, such as gears or shafts, housed in the axle housing. Lubricants used as fluid may include oil. To minimize or mitigate the splashing and churning of fluid, baffles, such as carters, may be positioned about portions of a rotational element.

One such baffle may be a carter positioned about a portion of a crown gear. A bevel set of gears may comprise the crown gear. The differential may comprise the bevel set of gears, and the bevel set of gears may be housed in the differential housing. The bevel set of gears may distribute rotational energy to the half shafts housed in the axle assembly. The carter positioned about the crown gear, may prevent splashing or churning losses from fluid thrown from or perturbed by the rotation of the crown gear. However, a baffle for a crown gear may be installed using specialized fasteners. The fasteners for the baffle may only be mounted to the housing after machining or other alterations are made to pre-existing housing. For example, mounts may be installed on the inner surfaces of the housing about the crown gear. The mounts may be compatible with the fasteners of the baffle. The mounts may be joined or physically coupled to the inner surfaces of the housing. Installing the mounts may increase the manufacturing time, as the shapes of the mounts are complex and are to be assembled with precision. Additionally, the mounts may use specific tools for creating the shape of the mounts and installing the mounts. The internal shape of housing may increase in complexity with the mounts. The mounts may disrupt the flow of fluid. Likewise, there may be more points of degradation and the mounts may be more prone to degradation compared to other features of the housing. If mounts are not use, additional holes complementary to the fasteners of the baffle may alternatively be machined through or created from the housing. However, creating holes from the material of the housing may decrease the structural strength of the housing. Likewise, the holes of the housing may degrade the housing.

The inventors herein have recognized these and other issues with such systems and have come up with a way to at least partially solve them. As developed in one example, is an axle comprising: a central housing; an axle arm fastened to the central housing via a plurality of first fasteners; and an oil baffle fixed to the central housing via at least one fastening element that is coaxial with at least one fastener from the plurality of first fasteners and at least one hole from a plurality of pre-existing holes of the central housing.

In an example, the fastening element is a screw or a bolt fastened to the baffle through a first existing hole for the at least one fastener at an interface between the axle arm and the central housing and a complementary hole of the baffle. The fastening element is complementary to an insert, and the insert is fit to the first existing hole and the complementary hole of the baffle to prevent the sliding or disengagement of the fastening element from the first existing hole and the hole of the baffle without a deliberate force. The insert comprises a head and a collar, wherein the head abuts a surface of the baffle, the head and collar are positioned about a through hole of the insert, and the collar receives the fastening element.

In an example, the fastening element is a snap fit element that is integral to the baffle. The fastening element fastens the baffle to the central housing through a first existing hole for the at least one fastener at an interface between the axle arm and the central housing. The fastening element physically couples to a mount of a plurality of mounts of the baffle, where the plurality of mounts extends in a radial direction from and may be physically coupled to a surface of the baffle. The fastening element elastically changes shape and increases or decreases in width with application of force, such as when inserted through the first existing hole. The fastening element comprises a body, a head, and a neck, wherein the body is column shaped and cylindrically shaped, and the neck is positioned between the body and head. The fastening element comprises a first prong and a second prong, and a gap between the first prong and second prong. The gap may be widened by a force such that the width of fastening element is increased. The gap may also be reduced by a force such that the width of the fasting element is decreased. The first prong and second prong may comprise portions of the head and neck of the fastening element.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
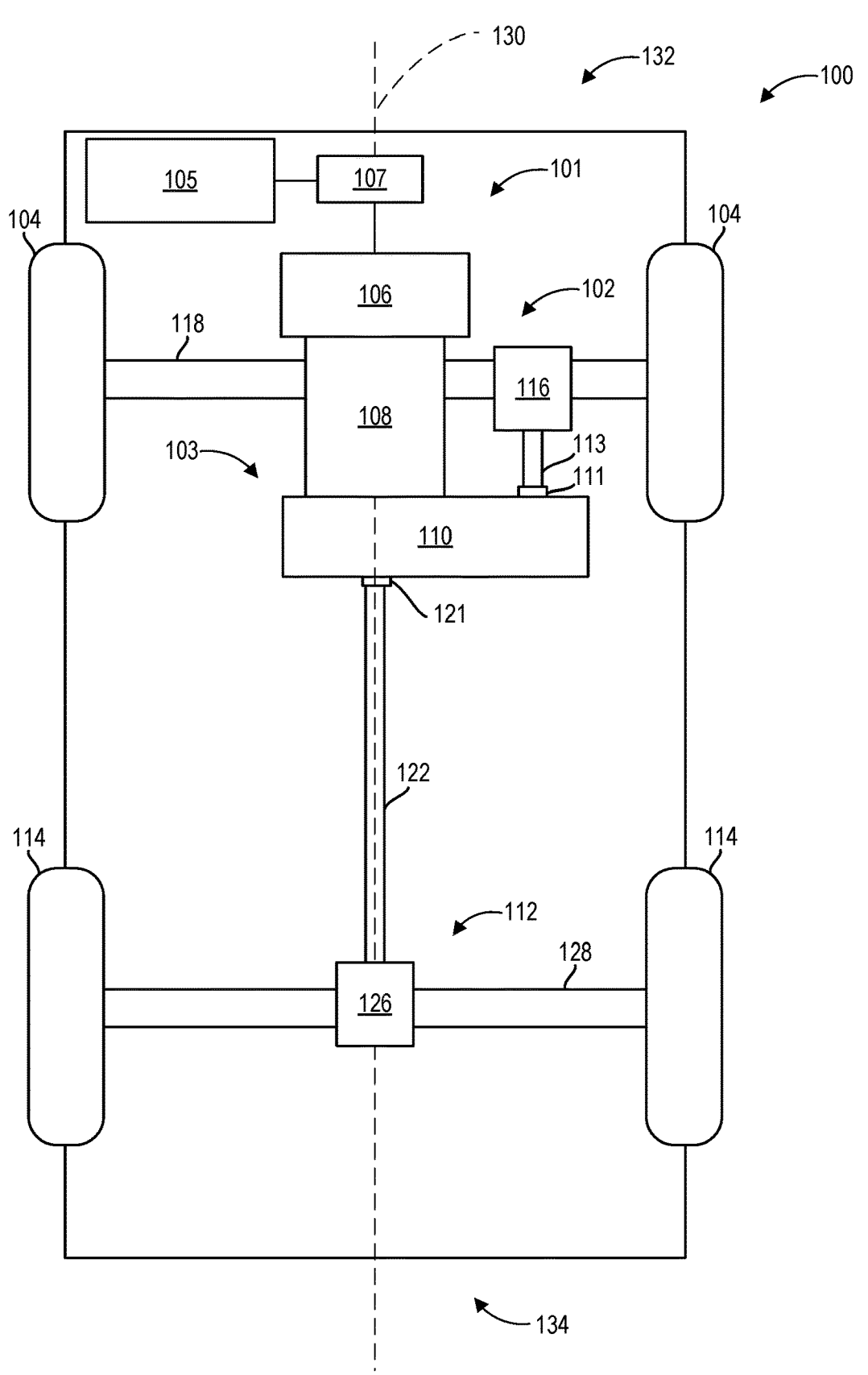
FIG. 1 shows an example schematic of a vehicle that may include the transmission of the present disclosure.

The following description relates to a fastening system that may fasten a baffle to at least one hole of a plurality of preexisting holes in a center housing for an axle assembly and an axle housing. The baffle may be a carter that may be positioned about a crown gear. The crown gear may be comprised by a system of a bevel assembly, and the bevel assembly may be comprised by a differential assembly. The axle housing may comprise a first housing and a second housing. The first housing is a center housing that may house a differential and a complementary bevel set. The second housing is the housing of an axle half shaft, such as an axle arm. The first and second housing may be fastened together at an interface via a plurality of first fasteners. The first fasteners may fasten the first and second housing via a plurality of first holes of the second housing and a plurality of second holes of the first housing. The first and second housing may be fastened via the first fasteners when the first holes and second holes are aligned as to be coaxial. The first fasteners may be main arm screws.

The second holes may be used by different fastening systems of a first configuration of baffle and a second configuration of baffle to mount their respective baffles to features of the first housing. The first embodiment of the baffle may be referred to herein as a first baffle. The first baffle may be compatible with or comprise a fastening system or a plurality of fastening systems of a first configuration. A fastening system of the first configuration may be referred to herein as a first fastening system. The second embodiment of the baffle may be referred to herein as a second baffle. The second baffle may be compatible with or comprise a fastening system or a plurality of fastening systems of a second configuration. A fastening system of the second configuration may be referred to herein as a second fastening system.

For the first baffle, the first fastening system may comprise a first fastening element and an insert. The first fastening element may be a fastener, such as a screw or a bolt fastened to the baffle through a first existing hole for the at least one fastener at an interface between the axle arm and the central housing and a complementary hole of the baffle. The first existing hole may be one of the aforementioned second holes described above. The first fastening element is complementary to an insert. The insert may be fit to the first existing hole and the complementary hole of the baffle. The insert may prevent the sliding or disengagement of the fastening element from the first existing hole and the hole of the baffle without a deliberate force. The insert comprises a head and a collar, wherein the head abuts a surface of the baffle, the head and collar are positioned about a through hole of the insert, and the collar may receive the fastening element.

For the second baffle, the second fastening system may comprise a second fastening element that is a snap fit element. The second fastening element may be a fastener that is integral to the baffle, such that the second fastening element is comprised by, joined to, or physically coupled to the second baffle. The second fastening element may fasten the second baffle to the central housing through a first existing hole for the at least one fastener at an interface between the axle arm and the central housing. The first existing hole may be one of a plurality of the second holes. The second fastening element may physically couple to a mount of a plurality of mounts of the baffle, where the plurality of mounts extends in a radial direction from and be physically coupled to a surface of the baffle. There may be a plurality of second fastening elements, wherein there may be one of the second fastening elements physically coupled to each of the plurality of mounts. The second fastening element may elastically change shape and increases or decreases in width from the application of force. The fastening element comprises a body, a head, and a neck, wherein the body is column shaped and cylindrically shaped, and the neck is positioned between the body and head. The fastening element comprises a first prong and a second prong, and a gap between the first prong and second prong. The gap between the first and second prong may be expanded in width by a force such that the width of the second fastening element is increased. Likewise, the gap between the first and second prong may be contracted in width by a force such that the width of the second fastening element is decreased. The first prong and second prong may comprise portions of the head and neck of the second fastening element. When the first prong and second prong are expanded, the first fastening element may not allow extraction of the fastener or the second baffle. The first fastening element may therein fix the second baffle to the first housing.

Figure 2:
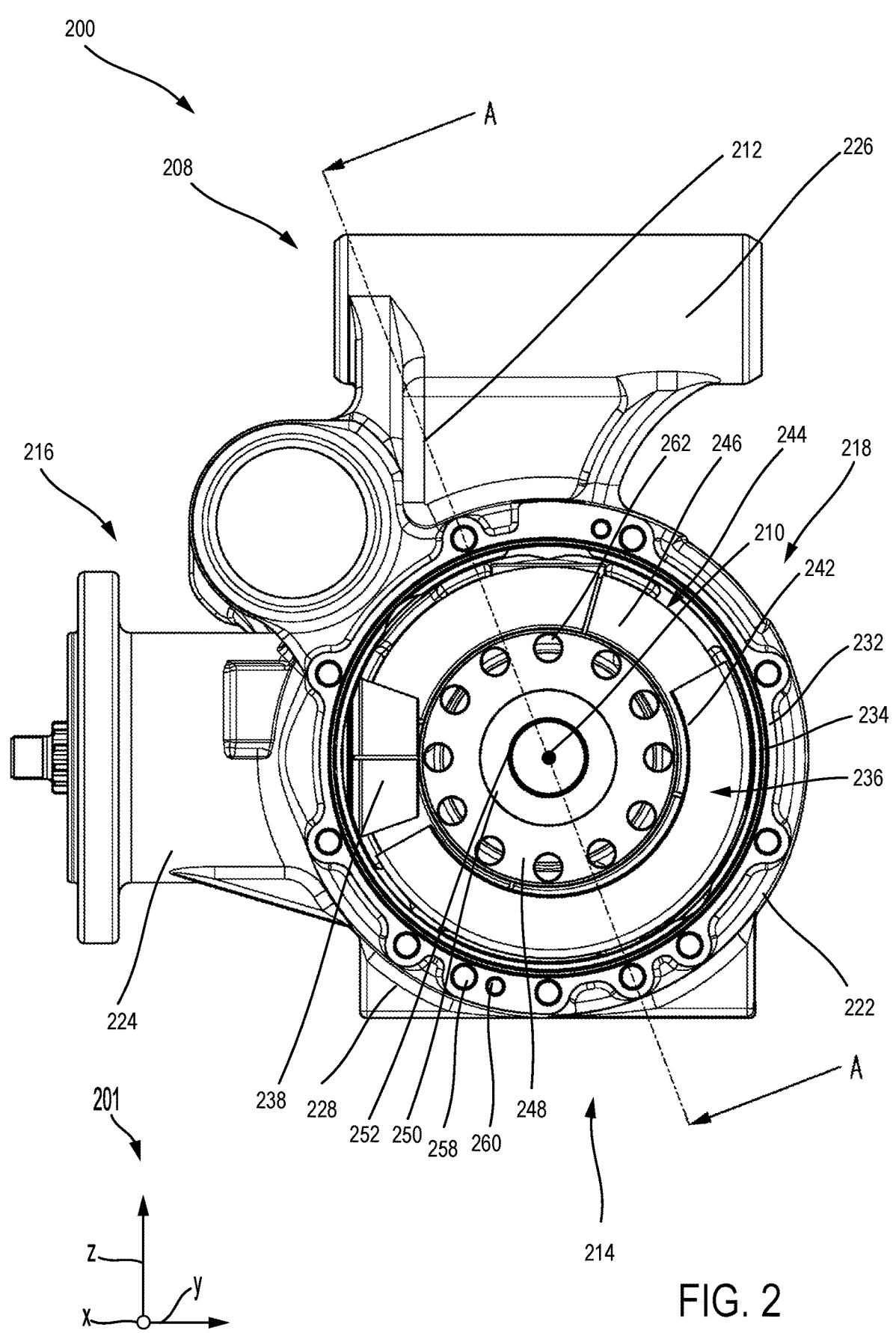
FIG. 2 shows a first view of an axle assembly including a baffle of the present disclosure.
Figure 3:
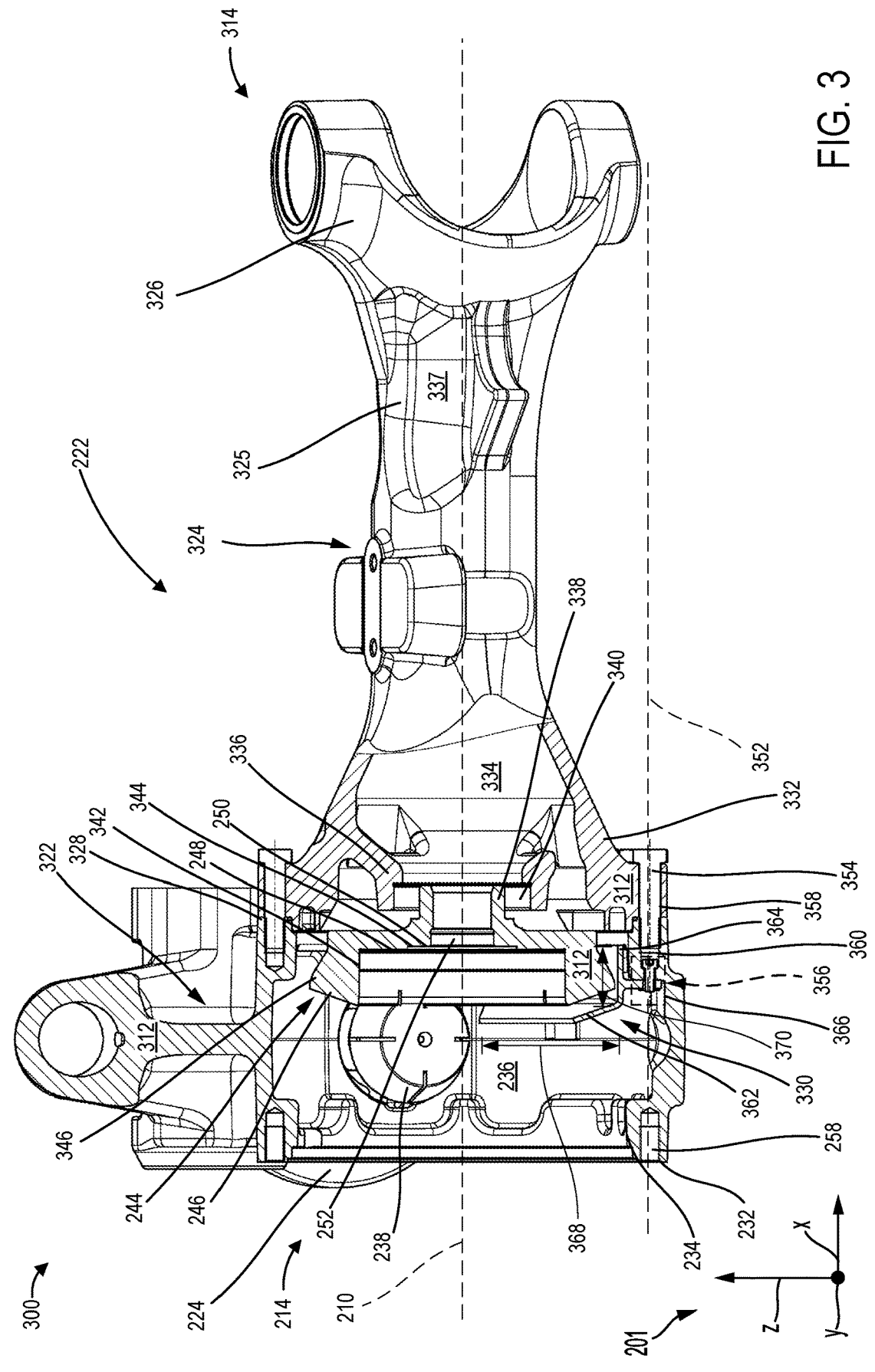
FIG. 3 shows a second view of an axle assembly including the first housing, second housing, and a baffle of a first configuration.
Figure 4:
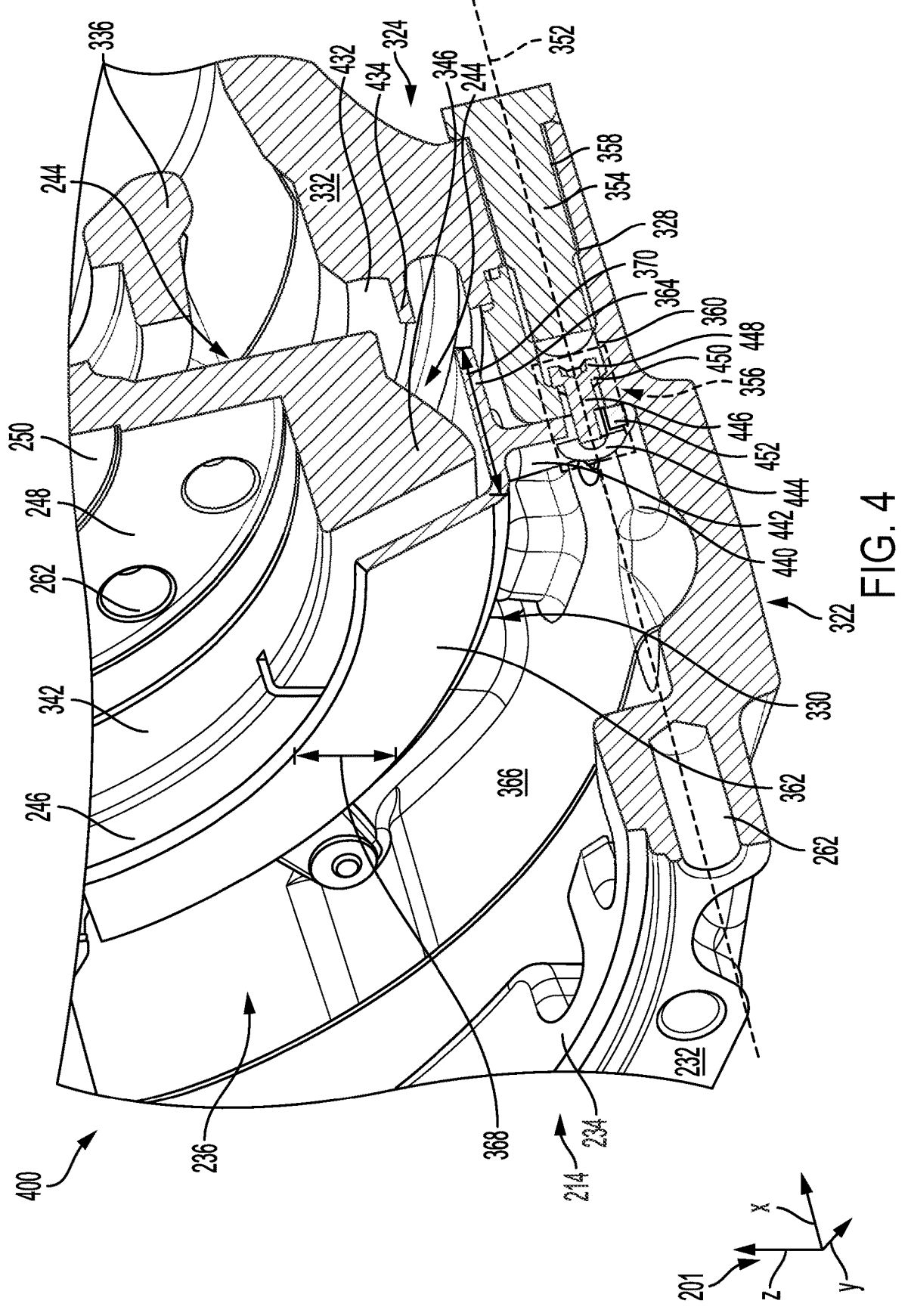
FIG. 4 shows a third view of the axle assembly from a cut including features and components of the fastening system.
Figure 5:
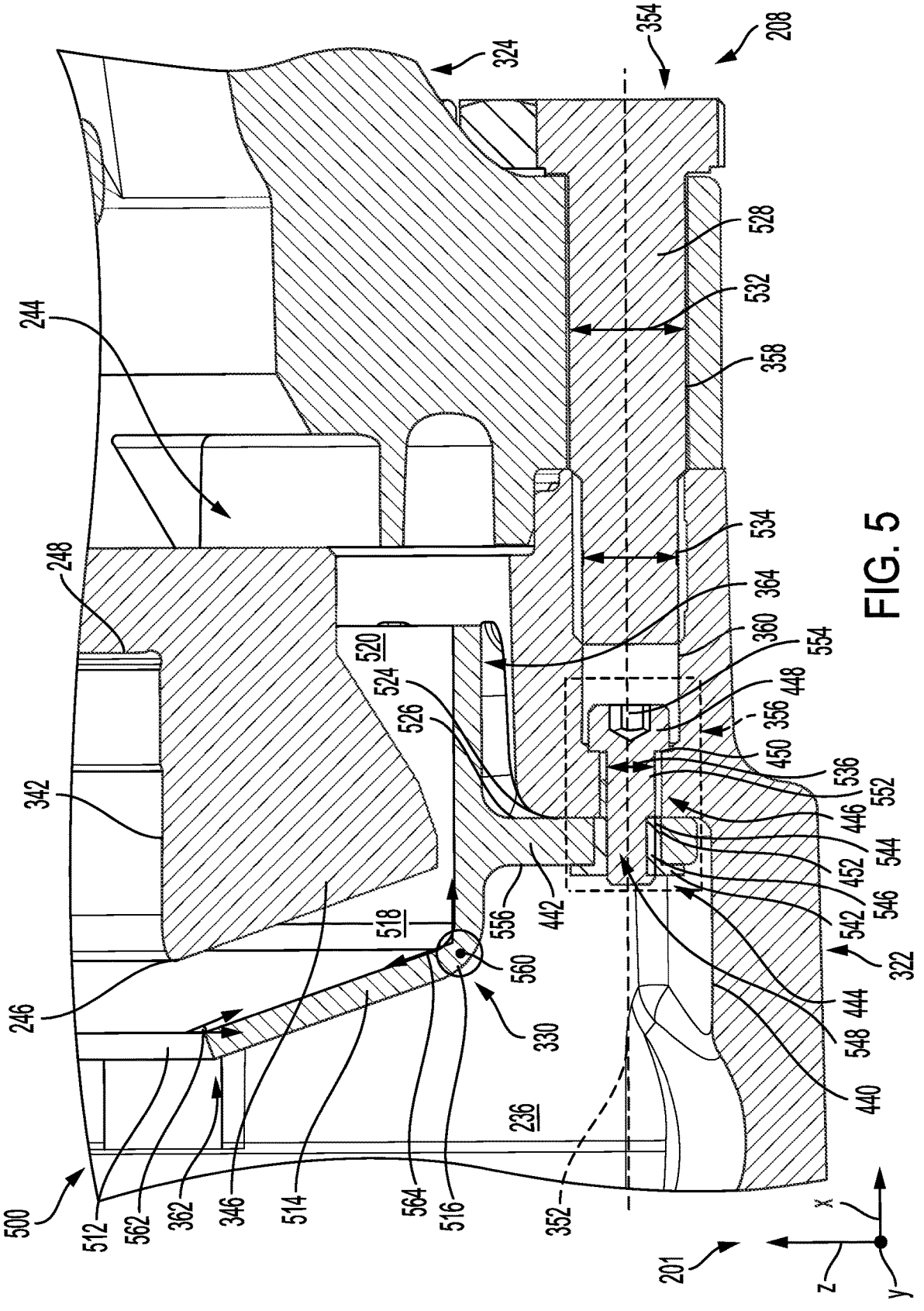
FIG. 5 shows a fourth view of the axle assembly closer to the fastening systems of FIGS. 3-4, and includes additional components and features of the fastening system.
Figure 6:
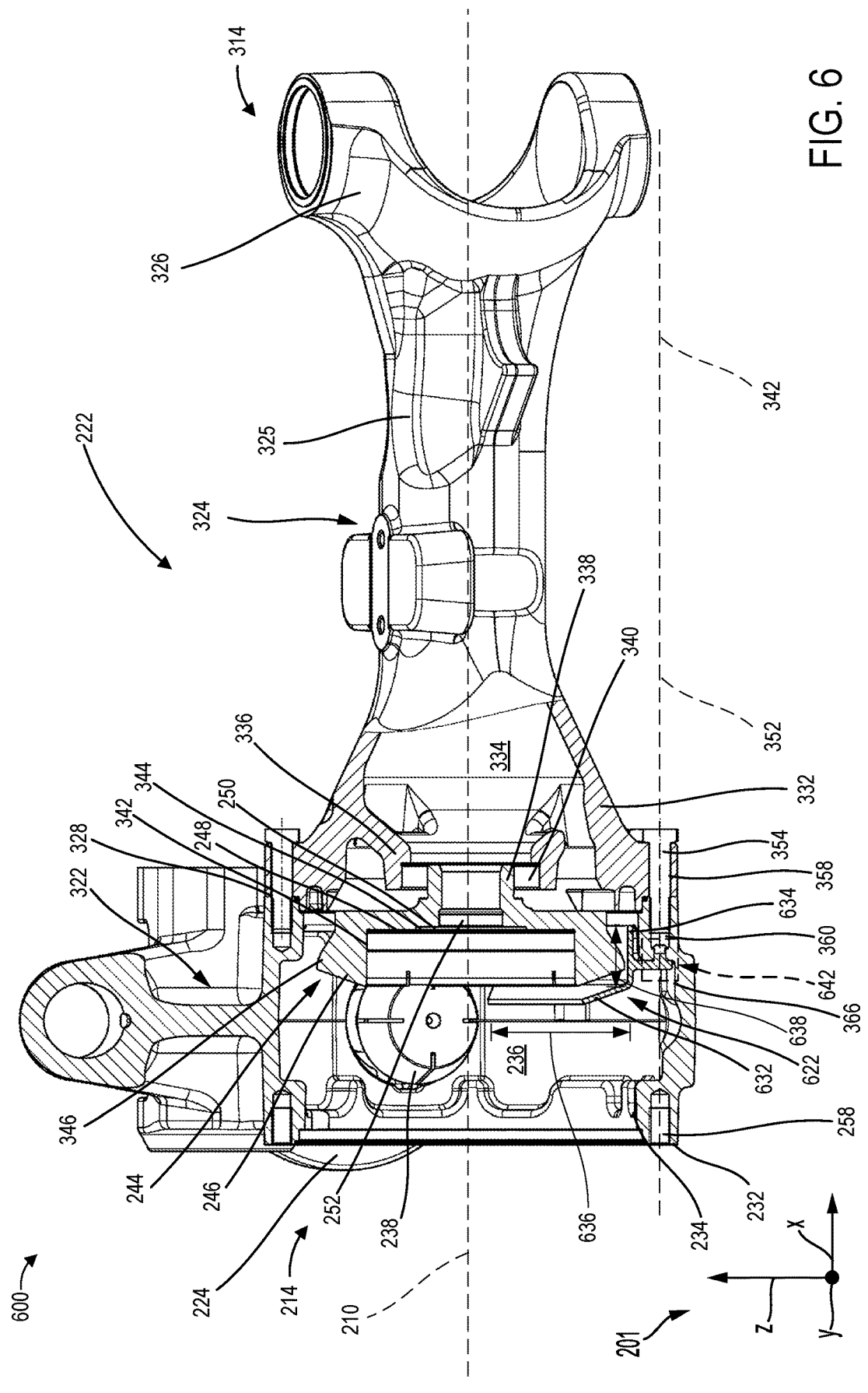
FIG. 6 shows a fifth view of the axle assembly including the first housing, second housing, and a baffle of a second configuration.
Figure 7:
FIG. 7 shows a sixth view of the axle assembly closer to the fastening system, including components and features of the fastening system.
Figure 8:
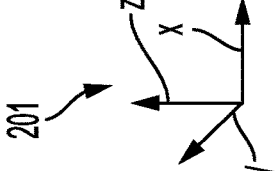
FIG. 8 shows a seventh view of the baffle of the second configuration.

FIG. 1 shows an example schematic of a vehicle that may include the transmission of the present disclosure. FIG. 2 shows a first view of an axle assembly including a baffle of the present disclosure. The baffle of the present disclosure may be positioned about a crown gear and mounted to the axle assembly. The first view also shows a line A-A indicating a cutout section view of the axle assembly. FIG. 3 shows a second view of an axle assembly including the first housing, second housing, and a baffle of a first configuration. The baffle of the first configuration uses a fastening system of a first configuration. The second view may be a partial sectional view, showing the cutout section taken on line A-A. FIG. 4 shows a third view of the axle assembly from a cut including features and components of the fastening system. FIG. 5 shows a fourth view of the axle assembly, including additional components and features of the fastening system. The fourth view of FIG. 5 also shows additional dimensions of the first hole and second hole. FIG. 6 shows a fifth view of the axle assembly including the first housing, second housing, and a baffle of a second configuration. The baffle of the second configuration uses a fastening system of a second configuration. The fifth view may be of the same position as the second view of FIG. 3. FIG. 7 shows a sixth view of the axle assembly closer to the fastening system, including components and features of the fastening system. The sixth view may be of the same position as the fourth view of FIG. 5. FIG. 8 shows a seventh view of the baffle of the second configuration. The seventh view may be an isolated view showing the baffle of the second configuration isolated from other components and features of the axle assembly.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIG. 1 shows a schematic of an example configuration with relative positioning of the various components. FIGS. 2-8 show example configurations with approximate positions. FIGS. 2-8 are shown approximately to scale; though other relative dimensions may be used. As used herein, the terms "approximately" is construed to mean plus or minus five percent of the range unless otherwise specified.

Further, FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to the longitudinal axis. Features described as lateral may be approximately parallel with the lateral axis and normal to the longitudinal axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The powertrain 101 comprises a prime mover 106 and a transmission 108. The prime mover 106 may be an internal combustion engine (ICE) or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting. Additionally, there may be other movers in the vehicle besides prime mover 106. If the prime mover 106 is an ICE there may be at least a second mover with an input to the transmission 108, wherein the second mover may be an electric machine such as an electric motor. In one example, if there are a single or plurality of second movers in addition to the prime mover 106, the vehicle 100 may be a hybrid vehicle, wherein there are multiple torque inputs to the transmission 108. The vehicle 100 may have a longitudinal axis 130. The powertrain 101 and drivetrain 103 may have a length parallel with the longitudinal axis 130.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, and/or sport utility vehicle. Additionally or alternatively, the vehicle 100 and/or one or more of its components may be in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 is an electric machine. In one example, the prime mover 106 is an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to vehicle 100, as part of the rotary power transferred via the second driveshaft 122. The first differential 116 and the second differential 126 may supply a FWD and RWD, respectively, as part of an AWD mode for vehicle 100.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, further comprising a second transmission arranged on the second set of axle shafts 128. Herein, the transmission 108 may be interchangeably referred to as a gearbox.

A set of reference axes 201 are provided for comparison between views shown in FIGS. 2-8. The reference axes 201 indicate a y-axis, an x-axis, and a z-axis. In one example, the z-axis may be parallel with a direction of gravity and the x-y plane may be parallel with a horizontal plane that an axle assembly 208 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 2, a first view 200 of an axle assembly 208 is shown. The axle assembly 208 may be positioned radially about a first axis 210. A first line 212 that may be referred to herein as line A-A indicates a cutaway section shown in later figures. The first axis 210 may be a lateral axis and perpendicular to the longitudinal axis of a vehicle, such as the longitudinal axis 130 of vehicle 100 of FIG. 1. The first axis 210 may also be a rotational axis for a shaft that may be housed by the axle assembly 208. The aforementioned shaft may be centered about the first axis 210, such as to be positioned radially about the first axis 210. The aforementioned shaft may also be an axle shaft, such as an axle shaft of the first set of axle shafts 118 or the second set of axle shafts 128 of FIG. 1. The first line 212 may be line for a sectional view to be taken on.

The first view 200 of axle assembly 208 may be taken on a first end 214 of the axle assembly 208. The axle assembly 208 has a first side 216 and a second side 218. The first side 216 is opposite to the second side 218 over the first axis 210. The first end 214 is visible from first view 200. An opposite end to the first end 214 is not visible from view 200. The first end 214 may correspond to a first extreme end of the axle arm and axle half shaft housed by the axle assembly 208. A second end opposite the first end 214 may correspond to a second extreme end of the axle arm and axle half shaft housed by the axle assembly 208.

A receiving collar 224 may be positioned on, and be comprised by or be joined to the first side 216. The receiving collar 224 may be a pinion nose or another structural feature that may receive and support a shaft. The receiving collar 224 may receive a drive shaft. For an example, the receiving collar may receive the first driveshaft 113 of FIG. 1 if the axle assembly 208 houses the first set of axle shafts 118 of FIG. 1. For another example, the receiving collar may receive the second driveshaft 122 of FIG. 1 if the axle assembly 208 houses the second set of axle shafts 128 of FIG. 1. Additionally, the axle assembly 208 may comprise a first block 226 and a second block 228. The first block 226 may be a base block via which the axle assembly 208 may rest upon a surface. The first block 226 and second block 228 may be mounting blocks used to mount the axle assembly 208 to features, such as a chassis, of a vehicle, such as vehicle 100.

The first end 214 may include an opening 234. A flange 232 may be positioned about the opening 234. The opening 234 may be contiguous with a cavity 236 of the axle assembly 208. The opening 234 may be circular. The opening 234 may receive a shaft such as an axle half shaft. For one example, the axle half shaft may include one of the axle half shafts of the first set of axle shafts 118. For another example, the axle half shaft may include one of the axle half shafts of the second set of axle shafts 128. The axle assembly 208 may comprise a portion of a differential housing, wherein the portion of the differential housing may comprise the cavity 236. The cavity 236 may house the gears and rotational elements of a differential and may receive a shaft, such as a drive shaft, via the receiving collar 224. A shaft may be received to the cavity 236 from the receiving collar 224 via a socket 238. The socket 238 may be continuous with the receiving collar 224.

The cavity 236 may also house a baffle 242 positioned about a gear 244. The baffle 242 may be positioned about a portion of the gear 244, about an outer edge of the gear 244. The gear 244 may comprise a first region 246, a second region 248, a third region 250, and a receiving hole 252. The receiving hole 252 may be concentric to the gear 244. The hole 252 may be centered about the axis 210, wherein the receiving hole 252 may be positioned radially about the axis 210. The first region 246, the second region 248, and the third region 250 positioned radially about the receiving hole 252 with respect to the axis 210. The first region 246 may be radially about the second region 248 and the third region 250, and the second region 248 may be radially about the third region 250. The baffle 242 may be an oil baffle, such as a carter, for the gear 244. The gear 244 may be a crown gear for a bevel assembly. The bevel assembly that comprises the gear 244 may be comprised by the differential assembly. The hole 252 may be a receiving hole, that a shaft, such as an axle half shaft, may extend through. When extending through the hole 252 and axle half shaft may be rotationally coupled to a side gear of the bevel assembly.

The flange 232 may comprise a plurality of first holes 258 and a plurality of second holes 260. The first holes 258 and second holes 260 may be complementary to a fastening mechanism. The aforementioned fastening mechanism may fasten the axle assembly 208 to another axle assembly to form a fully assembled axle. For example, if the axle assembly 208 is part of a front axle, the assembly 208 may be fastened to another complementary axle assembly to form a front axle assembly, such as first axle assembly 102 of FIG. 1. For another example, if the axle assembly 208 is part of a rear axle, the assembly 208 may be fastened to another complementary axle assembly to form a rear axle assembly, such as the second axle assembly 112 of FIG. 1. Likewise, the cavity 236 may comprise a housing for the differential and enclose the differential with a complementary housing component of the other axle assembly.

The gear 244 may comprise a plurality of third holes 262. The plurality of third holes 262 may extend in an axial direction with respect to the axis 210 through the material of the second region 248 of the gear 244. The third holes 262 may be positioned radially about the third region 250.

Turning to FIG. 3, it shows a second view 300 of the axle assembly 208. The second view 300 may face the second side 218 of FIG. 2 and may be taken on the y axis of the reference axes 201, wherein the y axis is negative to the second view 300.

The second view 300 may also be a sectional view that shows a cut 312 taken on first line 212 (e.g., line A-A) of FIG. 2. The cut 312 may be shown in part as dashed lines cutting into the material of the axle housing 222. The second view 300 shows a second end 314 of the axle assembly 208. The second end 314 is opposite the first end 214. The second end 314 may correspond to a second extreme end of the axle arm and axle half shaft housed by the axle assembly 208. The second end 314 of the axle assembly may be the aforementioned second end opposite the first end 214 described above for FIG. 2.

The second view 300 shows the axle assembly 208 may comprise a first housing component 322 and a second housing component 324. The first housing component 322 may be fastened to the second housing component 324 at an interface 328. The first housing component 322 may be a center housing and may house components such as the gears and other rotational elements of a differential assembly. The first housing component 322 may comprise the first cavity 236 and the opening 234. The first housing component 322 may comprise, join to, or fasten to the receiving collar 224 and flange 232. The first housing component 322 comprises the first end 214. The first housing component 322 is nearer to the first end 214 of the axle assembly 208 compared to the second end 314. The differential side of an axle half shaft housed by the axle assembly 208 may be positioned nearest to the first housing component 322. The second housing component 324 may be a shaft housing for a half shaft. The second housing component 324 may be an axle arm, such as for the example shown in FIG. 3. The second housing component 324 may comprise an axle tube 325. The axle tube 325 may be positioned about and house a shaft, such as an axle half shaft. As an axle arm, the second housing component 324 may comprise, be joined to, or fasten to a knuckle section 326. The second housing component 324 is nearer to the second end 314 from the first housing component 322. The knuckle section 326 may be arranged on and comprise the second end 314 of the axle assembly 208. The wheel side of an axle half shaft housed by the axle assembly 208 may be positioned nearest to the knuckle section 326 and second end 314. The cut 312 may create a sectional view on portions of the second housing component 324 allowing for features, such as the cavity 236, and components, such as the gear 244, to be visible from second view 300.

Positioned about the gear 244 and fixed to a surface of the cavity 236 and the first housing component 322 is a baffle of a first configuration, referred to herein as a first baffle 330. The first baffle 330 may be a configuration of the baffle 242 of FIG. 2. The gear 244 may be positioned above a portion of the first baffle 330. The gear 244 may also be positioned between a portion of the first baffle 330 and a second cavity 334. The second housing component 324 may comprise the second cavity 334. The second housing component 324 may also comprise a nose 332. The material of the nose 332 may comprise the surfaces that bound the cavity 334. The nose 332 may be joined to and contiguous with an axle tube 325. The axle tube 325 may extend from the nose 332 toward the second end 314. The axle tube 325 may be physically coupled to the knuckle section 326. The axle tube 325 is located about a passage 337. The passage 337 may be continuous with the second cavity 334. The passage 337 may receive a shaft, such as an axle half shaft, that may be housed by the axle housing 222. Likewise, the axle tube 325 may be positioned about the aforementioned shaft.

The nose 332 may comprise or be joined to a first collar 336. The first collar 336 may bound and be positioned about the second cavity 334. The first collar 336 may extend inwardly and radially toward the axis 210 from the material and surfaces of the nose 332. The first collar 336 may also extend from the nose and second cavity 334 toward the first cavity 236 a first end 214. The gear 244 may comprise a second collar 338. The second collar 338 is about and comprises the receiving hole 252. The first collar 336 may be positioned about a second collar 338, such as radially about the second collar 338 with respect to the axis 210. Likewise, a bearing 340 may be positioned about the second collar 338, such as radially about the second collar 338 with respect to the axis 210. The bearing 340 may be positioned between the second collar 338 and first collar 336. The bearing 340 may support the second collar 338, such that the second collar 338 may spin freely about the axis 210, such as when concentric to the first collar 336. Free rotation of the second collar 338 may allow the other portions of the gear 244 to rotate about the axis 210 with the second collar 338. A shaft received by the hole 252 may rotate about the axis 210 freely of the gear 244 and second collar 338. The gear 244 may also be rotationally coupled to the shaft via other gears, such as a complementary side gear. The receiving hole 252 may house a bearing or a bushing that may support a shaft received by the hole 252. Likewise, the receiving hole 252 may comprise a bushing. For an alternative example, a bushing may be used in place of bearing 340.

The second view 300 shows the gear 244 may comprise a first counter hole 342 and a second counter hole 344. The second region 248 may comprise the first counter hole 342. The first region 246 may be located radially about the first counter hole 342, such as radially about the first counter hole 342 with respect to the axis 210. The second region 248 may be located radially about the second counter hole 344, such as radially about the second counter hole 344 with respect to the axis 210. The gear 244 may also comprise a plurality of teeth 346. The teeth 346 may extend radially outward from the first region 246, such as radially outward from the first region 246 with respect to the axis 210. The first baffle 330 may be positioned about a portion of the teeth 346.

The first housing component 322 and second housing component 324 may be fastened via a plurality of first fasteners 354. The first fasteners 354 may extend through and fasten the first housing component 322 and second housing component 324 along a plurality of helical axes, such as a helical axis 352. For example, each of the first fasteners 354 may be centered about a helical axis of the helical axes when fastening the first housing component 322 to the second housing component 324. The helical axes, including helical axis 352 may be approximately parallel with and positioned radially about the axis 210. The first fasteners 354 may be connection members, fastening the first housing component 322 to the second housing component 324 at the interface 328. The first fasteners 354 may be screws that may be alternatively referred to as arm screws. In addition to the first fasteners 354, there may a plurality of first fastening systems 356. The first fastening systems 356 may be centered on the helical axes, such as helical axis 352, such as to be coaxial with the first fasteners 354. At least one fastening system of the first fastening systems 356 may fasten the first baffle 330 to the first housing component 322. For example, one of the first fastening systems 356 may be centered on helical axis 352. The fastening system of the first fastening systems 356 may be passed through a complementary hole of the baffle and one of the second holes 360. The fastening system of the first fastening systems 356 may be concentric to one of the first fasteners 354.

The first fastening systems 356 may be a first embodiment of a fastening system and complementary to the first baffle 330. Each of the first fastening systems 356 may comprise at least one fastening element. At least one fastening element of one of the first fastening systems 356 may fasten the first baffle 330 to the first housing component 322. The first fastening systems 356 may also comprise a sleeve or another form of insert fit to the fastening elements and the second holes 360.

The first fasteners 354 may extend through a plurality of first holes 358 and a plurality of second holes 360. The first holes 358 and second holes 360 may be a plurality of pre-existing holes of the axle housing 222. The second holes

360 may be a plurality of first existing holes of the first housing component 322. The first holes 358 may be a plurality of second existing holes of the second housing component 324. Each of the first fasteners 354 may extend through one of the first holes 358 and one of the second holes 360, such as when the first holes 358 and second holes 360 are aligned. A hole of the first holes 358 and a hole of the second holes 360 may be aligned when coaxial and centered about a helical axis, such as helical axis 352. The first holes 358 and second holes 360 may be complementary to and aligned on the helical axes, such that each of the first holes 358 and each of the second holes 360 may be centered about and complementary to a respective helical axis, such as helical axis 352. Likewise, the first fastening systems 356 may extend through complementary holes of the baffle and the second holes 360. Each of the first fastening system 356 may extend through a hole of the baffle and one of the second holes 360, when the hole of the baffle and the hole of the second holes 360 are centered on one of the helical axes. When extending through the first holes 358 and second holes 360, the first fasteners 354 may fasten the first housing component 322 to the second housing component 324. For example, if the first fasteners 354 are screws or bolts, the first fasteners 354 may be threaded through the first holes 358 and second holes 360. At least one of the first fasteners 354 may extend through a first hole of the first holes 358 and a complementary second hole of the second holes 360 to fasten the first housing component 322 to the second housing component 324. When extending through the complementary holes of the first baffle 330 and the second holes 360, the first fastening systems 356 may fasten the first baffle 330 to the first housing component 322. At least one of the first fastening systems 356 may extend through a complementary hole of the first baffle 330 and at least one hole of the second holes 360 to fasten the first baffle 330 to the first housing component 322.

The first baffle 330 may comprise a first shield section 362 and a first rim section 364. The first shield section 362 may be positioned between the gear 244 and the opening 234 with respect to the axis 210. Likewise, the first rim section 364 may be positioned below the gear 244. The first rim section 364 may be positioned between the gear and an inner surface 366 of the first cavity 236. The first shield section 362 may have a first length 368 and the first rim section 364 may have a second length 370. When positioned about an axis, such as axis 210, the first length 368 may extend in a radial direction from the axis and the second length 370 may be parallel with the axis. Likewise, when positioned about the gear 244 the first length 368 may extend in a radial direction from the centerline of the gear 244 and the second length 370 may be parallel with the centerline of the gear 244.

Turning to FIG. 4, it shows a third view 400 of the axle assembly 208. The third view 400 may show no favoritism toward any of the axes of the reference axes 201. The third view 400 shows the first cavity 236 and components housed in the first cavity 236. The third view 400 is also a sectional view that shows a cut 312 taken on first line 212 (e.g., line A-A) of FIG. 2.

Third view 400 shows a counter hole 432 and a rim 434. The rim 434 may be positioned about and support the second and third regions 248, 250 of the gear 244. The counter hole 432 may face the third region 250.

The third view 400 also shows the first baffle 330 may comprise a plurality of first mounts 442. The first rim section 364 may comprise or be joined to the first mounts 442. The inner surface 366 may comprise a plurality of grooves 440.

The first mounts 442 may extend radially from the first rim section 364. When the first baffle 330 is fastened to the first housing component 322, the each of the first mounts 442 may extend toward and have portions positioned within a complementary groove of the grooves 440.

Each of the first mounts 442 may be fastened to the first housing component 322 via the first fastening systems 356. Each of the first mounts 442 may comprise a plurality of third holes 452. There may be at least one hole of the third holes 452 complementary too and extending through the each of the first mounts 442. The components of each of the first fastening systems 356 may extend through the third holes 452 of the mounts 442. Each of the third holes 452 may be complementary and align with one of the second holes 360, such that the third holes 452 and second holes 360 may be centered about a helical axis, such as helical axis 352. When centered on the helical axes, such as helical axis 352, the first fastening systems 356 may extend through each of the third holes 452 and second holes 360.

Each of the first fastening systems 356 may comprise at least one of an insert 444 and one of a second fastener 446. The second fastener 446 may be the fastener element of each of the first fastening systems 356. The insert 444 may comprise the sleeve of each of the first fastening systems 356. There may be a plurality of inserts 444 and second fasteners 446. The second fasteners 446 may be fit to the inserts 444 such as to extend through the inserts 444 and a complementary mount of the first mounts 442. An insert of the inserts 444 may be received by one of the third holes 452. The insert 444 may receive the second fastener 446 from one of the second holes 360. The insert 444 may prevent sliding, such as along the helical axis 352, or disengagement of the second fastener 446 from one of the second holes 360. The insert 444 may prevent sliding, such as along the helical axis 352, or disengagement of the first fastening system 356 from one of the second holes 360. The second fastener 446 may be inserted into the second holes 360 from first holes 358 complementary to the second holes 360. For example, to fasten the first baffle 330 to the first housing component 322, at least one of the second fasteners 446 via at least one of the second holes 360 and at least one of the third holes 452. The at least one of the second fasteners 446 may be referred to as the second fastener. The at least one of the second holes 360 may be referred to as the second hole. The at least one of the third holes 452 may be referred to as the third hole. The second fastener may be inserted into the second hole. The second fastener may be inserted directly into the second hole before the first housing component 322 abuts the second housing component 324. When the first housing component 322 abuts the second housing component 324, the second fastener may be passed to the second hole via a hole of the first holes 358 that is complementary to the second hole. The second fastener may be passed through the third hole from the second hole. Some or all of the second fasteners 446 may fasten the first baffle 330 to the second housing by extending through some or all of the second holes 360 and third holes 452, as described above.

Each of the second holes 360 may be a first existing hole of the first housing component 322. Each of the first holes 358 may be a second existing hole of the second housing component 324. Existing holes may be holes created during the manufacturing of the first or second housing components 322, 324 before a baffle, such as the first baffle 330, is assembled to the axle housing 222.

The second fastener 446 may be of a screw type configuration, such as a screw, or of a bolt type configuration, such as a bolt. The second fastener 446 may comprise a head 448. When one of the second holes and a complementary third hole of the third holes 452 receives the second fastener 446, the head 448 may abut a shoulder 450 of the second holes 360.

Turning to FIG. 5, it shows a fourth view 500 of the axle assembly 208. The fourth view 500 may face the second side 218 of FIG. 2 and may be taken on the y axis of the reference axes 201, wherein the y axis is negative to the fourth view 500. The fourth view 500 is also a sectional view that shows the cut 312 taken on first line 212 (e.g., line A-A) of FIG. 2.

The first shield section 362 may comprise a first wall 512 and a second wall 514. The first wall 512 may be continuous with and connected to the second wall 514. The second wall 514 may be continuous with and be connected to the first rim section 364 via a first curve 516.

When the first shield section 362 is positioned radially about an axis, such as axis 210 of FIG. 3, the first wall 512 may extend in a radial direction from the axis. The second wall 514 may extend away from the first curve 516 toward a centerline of the first baffle 330 or an axis the first baffle 330 may be positioned about. The first rim section 364 may extend away from the first curve 516 parallel to the centerline of the first baffle 330 and/or the axis the first baffle 330 may be positioned about. The first shield section 362 and first rim section 364 may be positioned about a volume.

Portions of the gear 244 may be housed in the volume. The gear 244 may divide the volume into a first space 518 and a second space 520. The first space 518 may be positioned between the gear 244 and the first shield section 362. The second space 520 may be positioned between the gear 244 and the first rim section 364. The first space 518 and second space 520 may be separated by via teeth 346.

Each of the first holes 358 may be of a first diameter 532. Each of the second holes 360 may comprise a first section of a second diameter 534 and a second section of a third diameter 536. The first diameter 532, the second diameter 534, and the third diameter 536 may be of different distances. The first diameter 532 may be greater than the second and third diameters 534, 536. The second diameter 534 may be a greater distance than the third diameter 536. The difference between the second diameter 534 and third diameter 536 creates the shoulder 450 for the first head 448 to abut. Additionally, a counter hole comprising the shoulder 450 may be positioned between a first section of the second hole 360 of the second diameter 534 and a second section of the second hole 360 comprising the third diameter 536. The insert 444 may fit to the second section of the second hole 360 of the third diameter 536. When fastened to the first housing component 322 via the insert 444 and second fastener 446, the first mounts 442 may abut and have surface sharing contact with a surface 524 of the first housing component 322. The mounts 442 may each have surface sharing contact with surface 524 via a first face 526. There may be a plurality of the first faces 526, wherein each of the mounts 442 has one of the first faces 526.

The first fasteners 354 may have a shank 528 fit to at least the second diameter 534, such that the first fasteners 354 may extend through the first and second holes 358, 360. The first fasteners 354 may have the shank 528 comprised of a first section fit to the first diameter 532 and a second section fit to the second diameter 534. The first fasteners 354 may have a threading at least complementary to the second holes 360. For one example, the first fasteners 354 may have a threading complementary to the second holes 360 on the aforementioned second section of the shank 528. Likewise, the first fastener 354 may have a treading complementary to the first holes 358 on the aforementioned first section of the shank 528.

The insert 444 may comprise a second head 542 and a collar 544. The second head 542 may abut and be in surface sharing contact with a second face 556 of the first mounts 442. There may be a plurality of the second faces 556, wherein each of the mounts 442 has one of the second faces 556. The second head 542 may distribute force and pressure from the compressive force provided by the second fastener 446 and the insert 444 across each of the mounts 442. The second head 542 and collar 544 are positioned about a through hole extending through the insert. The collar 544 may be of a fourth diameter 546 and a fifth diameter 548. The fourth diameter 546 may be an inner diameter of the collar 544 and the diameter of the through hole of the insert 444. The fifth diameter 548 may an outer diameter of the collar 544. The fifth diameter 548 may be approximately the same diameter as the diameter of the third hole 452, such that the collar 544 may be fit to the third holes 452 and may be prevented from pullout without a deliberate axial force above a threshold. The dimensions of the insert 444, such as the fifth diameter 548, may be changed to accommodate different dimensions of the third holes 452.

In addition to the first head 448, the second fastener 446 may comprise a shank 552. The shank 552 may be fit to the fourth diameter 546. The shank 552 may have a threading complementary to the collar 544, such that the second fastener 446 may fasten to the insert 444 when threaded through the collar 544. The first head 448 may comprise a hole 554. The hole 554 may be a manipulator hole for a device such, as a screwdriver or an Allen key, that may be used to fasten or unfasten the second fastener 446 from the insert 444.

Returning to the first baffle 330. The second wall 514 may extend at a first angle 562 from the first wall 512. The second wall 514 may be positioned at the first angle 562 from extending radially with respect to an axis the first shield section 362 is positioned radially about. The second wall 514 may extend at a second angle 564 from the first wall 512. The first curve 516 may comprise the second angle 564. The first curve 516 may comprise and be of a first radius 560.

In this way, an embodiment of a baffle, such as a carter, may be mounted to a housing of an axle assembly via fasteners of a fastening system. The fasteners of the fastening system may be screws or bolts that may use existing holes of the housing to mount the baffle to the housing. For example, there may be a second hole of the main housing and a first hole of the housing for the axle half shaft. The first hole and second hole may be fastened by a first fastener, and when fastened, may fasten the main housing to the housing of the axle half shaft. The first hole and second hole may be aligned along a common centerline and helical axis. A second fastener of the fastening system may use the second hole to fasten the baffle to the main housing. The fasteners of the fastening system may mount the baffle via the holes using minimal modification. Such modifications may include for example an insert that may be positioned between the fastener and the existing hole. Both the second fastener and insert may extend through the second hole of the main housing and a complementary hole of the baffle to fasten the baffle to the main housing. When fastened via the fastening system, the baffle may be mounted to and may be pressed against features of the main housing via features of the fastening system. There may be a plurality of first holes, second holes, first fasteners, second fasteners, and complementary holes of the baffle that may be complementary to a plurality of first fastening systems.

Turning to FIG. 6, it shows a fifth view 600 of the axle assembly 208. The fifth view 600 may face the second side 218 of FIG. 2 and may be taken on the y axis of the reference axes 201, wherein the y axis is negative to the fifth view 600. The fifth view 600 may be the second view 300 of FIG. 3. The axle housing 222 and the axle assembly 208 are approximately the same as in FIG. 3.

The axle assembly 208 of fifth view 600 uses a different baffle and fastening system. Positioned about the gear 244 and fixed to a surface of the cavity 236 and the first housing component 322 is a baffle of a second configuration, referred to herein as a second baffle 622. The second baffle 622 may be a configuration of the baffle 242 of FIG. 2. The gear 244 may be positioned above a portion of the second baffle 622. The gear 244 may also be positioned between a portion of the second baffle 622 and a second cavity 334.

In addition to the first fasteners 354, there may a plurality of second fastening systems 642 that may be centered on the helical axes, such as the helical axis 352. For example, one of the second fastening systems 642 may be centered on helical axis 352. Each of the second fastening systems 642 may be joined to or be comprised by the second baffle 622. The second fastening system 642 may comprise fasteners or other fastening elements that are not screws or bolts. The second fastening system 642 comprises a fastening element, such as a fastener, joined or physically coupled to the second baffle 622.

The first fasteners 354 may extend through a plurality of first holes 358 and a plurality of second holes 360. Each of the first fasteners 354 may extend through one of the first holes 358 and one of the second holes 360, when the hole of the first holes 358 and the hole of the second holes 360 are centered on one of the helical axes, such as helical axis 352. The first holes 358 and second holes 360 may be complementary to and aligned on a helical axis 352. Likewise, second fastening systems 642 may extend through the second holes 360. Each of the second fastening systems 642 may extend through one of the second holes 360. When extending through the first holes 358 and second holes 360, the first fasteners 354 may fasten the first housing component 322 to the second housing component 324. For example, if the first fasteners 354 are screws or bolts, the first fasteners 354 may be threaded through the first holes 358 and second holes 360. At least one of the first fasteners 354 may extend through one the first holes 358 and a complementary second hole of the second holes 360 to fasten the first housing component 322 to the second housing component 324.

When extending through the second holes 360, the second fastening systems 642 may fasten the second baffle 622 to the first housing component 322. At least one of the second fastening systems 642 may extend through at least one hole of the second holes 360 to fasten the second baffle 622 to the first housing component 322. A plurality of the second fastening systems 642 may extend through the second holes 360 to fasten the second baffle 622 to the first housing component 322.

The second baffle 622 may comprise a second shield section 632 and a second rim section 634. The second shield section 632 may be positioned between the gear 244 and the opening 234 with respect to the axis 210. Likewise, the second rim section 634 may be positioned below the gear 244. The second rim section 634 may be positioned between the gear and an inner surface 366 of the first cavity 236. The second shield section 632 may have a first length 636 and the second rim section 634 may have a second length 638. When positioned about an axis, such as axis 210, the first length 636 may extend in a radial direction from the axis and the second length 638 may be parallel with the axis. Likewise, when positioned about the gear 244 the first length 636 may extend in a radial direction from the centerline of the gear 244 and the second length 638 may be parallel with the centerline of the gear 244.

Turning to FIG. 7, it shows a sixth view 700 of the axle assembly 208. The fourth view 500 may face the second side 218 of FIG. 2 and may be taken on the y axis of the reference axes 201, wherein the y axis is negative to the sixth view 700. The sixth view 700 is also a sectional view that shows the cut 312 taken on first line 212 (e.g., line A-A) of FIG. 2.

The second shield section 632 may comprise a third wall 712 and a fourth wall 714. The third wall 712 may be continuous with and connected to the fourth wall 714. The fourth wall 714 may be continuous with and be connected to the second rim section 634 via a second curve 716.

When the second shield section 632 is positioned radially about an axis, such as axis 210 of FIG. 3, the third wall 712 may extend in a radial direction from the axis. The fourth wall 714 may extend away from the second curve 716 toward a centerline of the second baffle 622 and/or an axis the second baffle 622 may be positioned about. The second rim section 634 may extend away from the second curve 716 parallel to the centerline of the second baffle 622 and/or the axis the second baffle 622 may be positioned about.

The second shield section 632 and the second rim section 634 may be positioned about a volume. Portions of the gear 244 may be housed in the volume. The gear 244 may divide the volume into a third space 718 and a fourth space 720. The third space 718 may be positioned between the gear 244 and the second shield section 632. The fourth space 720 may be positioned between the gear 244 and the second rim section 634. The third space 718 and fourth space 720 may be separated via the teeth 346.

The sixth view 700 shows the second fastening systems 642 may each comprise a third fastener 750 physically coupled to a second mount 742. The third fastener 750 may be integral to the second baffle 622 via the second mount 742. The third fastener 750 may be joined or physically coupled at a first surface 744 of the second mount 742. There may be a second surface 748 on the opposite side of the second mount 742 from the first surface 744. The first surface 744 and second surface 748 may be parallel. There may be a plurality of third fasteners 750 and second mounts 742 physically coupled to and/or comprised by the second baffle 622. There may be a plurality of first surfaces 744 and second surfaces 748, wherein there may be at least one of the first and second surfaces 744, 748 for each of the second mounts 742. The second mounts 742 may extend radially from the second baffle 622 toward the grooves 440. The third fasteners 750 may have a length 758 and a centerline normal to the second mounts 742. The third fasteners 750 may extend through the second holes 360. For example, the third fasteners 750 may be centered on and extend along the helical axes, such as helical axis 352, of the first fasteners 354, the first holes 358, and second holes 360. When the second baffle 622 is fastened to the first housing component 322 via the second fastening system 642, the second mounts 742 may have surface sharing contact with the first housing component 322. When the second mounts 742 are in surface sharing contact with the first housing component 322, a single or plurality of the first surfaces 744 may abut a surface 746 of the first housing component 322.

Each of the third fasteners 750 may comprise a body 752, a third head 754, and a neck 756. The body 752 may be a cylindrical in shape and column shaped may be of approximately the third diameter 536 such as to be fit to the second section of the second hole 360 of the third diameter 536. The third head 754 may abut the shoulder 450. The abutment and expansion of the third head 754 against the shoulder 450 may prevent the third fasteners 750 from being pulled from the second hole 360. The third fasteners 750 may be inserted into the second hole 360 from the first cavity 236 via the section of the second hole 360 of the third diameter 536. The neck 756 may be of a first width 772. The third head 754 may be of a second width 774. The width 772 may be smaller in distance than the third diameter 536. The difference in the third diameter 536 and the first width 772 may allow the neck 756 and third head 754 to be pressed through the second hole 360. The section of the second hole 360 of the second diameter 534. The difference in the third diameter 536 and the second width 774 may prevent the head 754 from being pulled through the second hole 360 toward the first cavity 236, such as when the third fastener 750 is pulled along the helical axis 352. The first width 772 and the second width 774 may each be a variable width, such that the first width 772 and second width 774 may change distance with the application of force. A first force may cause the first width 772 and the second width 774 increase. Likewise, a second force may cause the first width 772 and second width 774 to decrease. The first force and the second force may be equal forces applied in opposite directions. The change in the first width 772 and second width 774 from force may be elastic and reversible when force is removed. For example, if the first width 772 and/or second width 774 are expanded in distances by a force, the first width 772 and/or second width 774 may return to original distances when the force is removed. For example, if the first width 772 and/or second width 774 are contracted in distances by a force, the first width 772 and/or second width 774 may return to original distances when the force is removed.

Returning to the second baffle 622. The fourth wall 714 may extend at a first angle 762 from the third wall 712. The fourth wall 714 may be positioned at the first angle 762 from extending radially with respect to an axis the second shield section 632 is positioned radially about. The fourth wall 714 may extend at a second angle 764 from the third wall 712. The second curve 716 may comprise the second angle 764. The second curve 716 may comprise and be of a second radius 760.

The second baffle 622 may have the same dimensions as the first baffle 330 of FIG. 3, with exception to second mounts 742 and first mounts 442 of FIG. 4, respectively. The first shield section 362 may be of approximately the same dimensions as the second shield section 632. The first rim section 364 may be of approximately the same dimensions as the second rim section 634.

Turning to FIG. 8, it shows a seventh view 800 of second baffle 622. The seventh view 800 that shows no favoritism toward any axis of the reference axes 201. The seventh view 800 shows the portion of the second baffle 622, wherein the second baffle 622 is isolated from other components and features of the axle assembly 208.

The third fastener 750 and the second mount 742 may be centered on an axis 810. The axis 810 may be positioned to be collinear with a helical axis, such as helical axis 352, of the first fasteners 354, the first holes 358, and second holes 360. The second mount 742 may extend radially from an outer surface 822 of the second baffle 622. The third fastener 750 may extend in a direction along on the axis 810 from the first surface 744. The axis 810 may be normal to the first surface 744. A surface parallel to first surface 744, such as the second surface 748 of FIG. 7, may be comprised by and located on the opposite side of the second mount 742 from the first surface 744. The second mount 742 may comprise an edge 832 positioned between the first surface 744 and the aforementioned opposite and parallel surface. The edge 832 may extend and curve about the second mount 742 via a round 834. Fillets, such as a plurality of first fillets 826 and a plurality of second fillets 828, may join the second mount 742 to the second baffle 622. The first and second fillets 826, 828 may make the surfaces of the second mount 742 continuous with the outer surface 822.

The third fastener 750 may comprise a first prong 852 and a second prong 854. The first prong 852 and second prong 854 may be separated by a gap 856. The gap 856 may split the head 754 and neck 756 into two components. For example, the first prong 852 may comprise a first portion of the head 754 and a first portion of the neck 756. The second prong 854 may comprise a second portion of the head 754 and a second portion of the neck 756.

The gap 856 may be of a width 876. The width 876 may be a variable width, such that a force may widen the gap 856 spreading the first prong 852 and second prong 854 further apart. Likewise, force may decrease the width 876 of the gap 856 pushing the first prong 852 and second prong 854 closer together. The expansion or contraction of the width 876 between the first prong 852 and second prong 854, may be elastic and reversible, allowing the width 876 to return to an original threshold of distance when a force is removed. The expansion of the width 876 may increase the first width 772 and second width 774 and shape of the third fastener 750. The spreading of the first prong 852 and second prong 854 from the gap 856 be an anti-pullout feature of the third fastener 750, preventing movement in an axial direction with respect to the helical axis 352 against the shoulder 450 of FIG. 6. Likewise, the spreading of the first prong 852 and second prong 854 from the gap 856 may be a snap fitting feature.

For one example, a first force 882 may act upon the head 754. The first force 882 may be an inward force relative to the third fastener 750, such that the vector of first force 882 may push in an inward and radial direction toward the axis 810. The vector of the first force 882 may be represented by an arrow. The first force 882 may push the first prong 852 and second prong 854 closer together, causing the width 876 to contract. Contraction of the gap 856 may decrease the first width 772, such that the head 754 and neck 756 may be passed through the section of the second hole 360 of the third diameter 536 of FIG. 7. For another example a second force 884 may act upon the head 754. The second force 884 may be an outward force relative to the third fastener 750, such that the vector of the second force 884 may push in an outward and radial direction from the axis 810. The second force 884 may force the first prong 852 and second prong 854 to spread further apart and the width 876 to expand. The expansion of the gap 856 may expand the first width 772, such that features of the third fasteners 750 may abut and be prevented from passing through the section of the second holes 360 of the third diameter 536. The expansion of gap 856 and at least one of the third fasteners 750 that comprises gap 856, may fix the second baffle 622 to the first housing component 322. When fixed to the first housing component 322, removal of the third fasteners 750 and second baffle 622 may be prevented from the second holes 360.

Excluding the third fastener 750 and the third holes 452 of FIG. 4, each of the second mounts 742 may comprise the same features and dimensions as the first mounts 442 of FIG. 4.

In this way, an embodiment of a baffle, such as a carter, may be mounted to a housing of an axle assembly via fasteners of a second fastening system. The fasteners of the second fastening system may not comprise screws or bolts. The fasteners of the second fastening system are of a snap fit configuration. The fasteners of the second fastening system may be fit to preexisting holes of the housing and the axle assembly. For example, there may be a second hole of the main housing and a first hole of the housing for the axle half shaft. The first hole and second hole may be fastened by a first fastener, and when fastened may fasten the main housing to the housing of the axle half shaft. The first hole and second hole may be aligned along a common centerline and helical axis. A third fastener of the fastening system may use the second hole to fasten the baffle to the main housing. The third fastener may be joined to or be comprised by the baffle. There may be a plurality of the third fasteners and a plurality of second holes. The third fasteners of the fastening system may mount the baffle via a plurality of the second hole using minimal modification. The third fasteners may incorporate features, such as prongs, that may allow for shape change or the third fasteners. The aforementioned shape change may occur when the third fasteners are pressed into the second hole and mount the baffle to the first housing. The shape change features and shape change of the fasteners may act as an anti-pullout feature. The shape change features and shape change of the fasteners may allow the fastener to expand in diameter to fit a preexisting hole.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An axle comprising:
a central housing;
a plurality of first fasteners that fasten an axle arm to the central housing; and
at least one fastening element fixing a baffle to the central housing;
wherein the at least one fastening element is coaxial with at least one fastener from the plurality of first fasteners and at least one hole from a plurality of pre-existing holes of the central housing.

2. The axle of claim 1, wherein the at least one fastening element is a screw or a bolt fastened to the baffle through a first existing hole for the at least one fastener at an interface between the axle arm and the central housing and a complementary hole of the baffle.

3. The axle of claim 2, wherein the at least one fastening element is adjacent to an insert, and the insert is fit to the first existing hole and the complementary hole of the baffle of the fastening element.

4. The axle of claim 3, wherein the complementary hole of the baffle is positioned on a mount of a plurality of mounts, where the plurality of mounts extends in a radial direction from a surface of the baffle.

5. The axle of claim 4, wherein the insert comprises a head and a collar, wherein the head abuts the surface of the baffle, the head and collar are positioned adjacent to a through hole of the insert, and the collar receives the fastening element.

6. The axle of claim 5, wherein the fastening element is adjacent to a threading of the through hole, and the fastening element is threaded through the through hole of the insert to fasten to the insert and the existing hole.

7. The axle of claim 6, wherein the fastening element is passed through the first existing hole from a second existing hole of a plurality of second existing holes, wherein the second existing hole is adjacent to the first existing hole, wherein the one fastener from the plurality of first fasteners is fastened through the first existing hole and the second existing hole.

8. The axle of claim 6, wherein the first existing hole comprises a first section of a first diameter and a second section of a second diameter, wherein the first diameter and second diameter are of different distances.

9. The axle of claim 8, wherein the fastening element comprises a head and a shank, wherein the head of the fastening element abuts a shoulder of the first existing hole on an opposite side of the first existing hole from the baffle.

10. The axle of claim 1, wherein:
the fastening element is a snap fit element that is integral to the baffle; and
the fastening element fastens the baffle to the central housing through a first existing hole for the at least one fastener at an interface between the axle arm and the central housing.

11. The axle of claim 10, wherein:
the fastening element physically couples to a mount of a plurality of mounts of the baffle; and
the plurality of mounts extends in a radial direction from and are physically coupled to the baffle.

12. The axle of claim 11, wherein:
the fastening element comprises a body, a head, and a neck; and
the body is column shaped and cylindrically shaped, and the neck is positioned between the body and head.

13. The axle of claim 12, wherein the fastening element comprises a first prong and a second prong, and a gap between the first prong and second prong is increased in width by a first force such that the width of fastening element is increased, and the gap between the first prong and second prong is decreased in width by a second force.

14. The axle of claim 1, wherein the baffle comprises a shield section and a rim section, and when the baffle is positioned adjacent to a gear, the shield section has a first length that is radial with respect to the gear, the rim section has a second length that is axial with respect to the gear; the rim section comprises a first wall and a second wall, wherein the second wall extends at a first angle from the first wall, the second wall extends at second angle from the rim section, and the second wall is curved, connected to, and continuous with the rim section.

15. An axle comprising:
a central housing;
a plurality of first fasteners fastening an axle arm to the central housing; and
at least one fastening system fixing an oil baffle to the central housing, wherein the at least one fastening system is coaxial with at least one fastener from the plurality of first fasteners and at least one hole from a plurality of pre-existing holes of the central housing;
wherein the fastening system comprises a second fastener and an insert and
wherein the second fastener has a screw type configuration or a bolt type configuration and the insert is positioned adjacent to the second fastener.

16. The axle of claim 15, wherein:
there is a plurality of fastening systems of the one fastening system; and
each of the fastening systems is concentric to at least a portion of the pre-existing holes and the first fasteners.

17. The axle of claim 15, wherein the baffle comprises a shield section and a rim section, and when the baffle is positioned adjacent to a gear, the shield section has a first length that is radial with respect to the gear, the rim section has a second length that is axial with respect to the gear; the rim section comprises a first wall and a second wall, wherein the second wall extends at a first angle from the first wall, the second wall extends at second angle from the rim section, and the second wall is curved, connected to, and continuous with the rim section.

18. An axle comprising:
a central housing;
a plurality of first fasteners fastening an axle arm to the central housing; and
at least one fastening system fixing an oil baffle fixed to the central housing, wherein the at least one fastening system is coaxial with at least one fastener from the plurality of first fasteners and at least one hole from a plurality of pre-existing holes of the central housing
wherein the fastening system comprises a fastening element that is a second fastener;

wherein the second fastener is a fastener of a snap fit configuration and comprises a snap fit element and wherein the second fastener is integral or physically coupled to the baffle.

19. The axle of claim 18, wherein the second fastener is physically coupled to a mount that is physically coupled to the baffle, wherein the second fastener comprises a body, a neck, and a head, wherein the head is positioned between the body and the neck, and wherein the head and neck have a variable width that elastically expands or contracts when force is applied.

20. The axle of claim 19, wherein:

the second fastener comprises a first prong and a second prong separated by a gap;

the first prong comprises a first portion of the head and a first portion of the neck;

the second prong comprises a second portion of the head and a second portion of the neck, and a distance of the gap is variable, such that an application of force the gap expands or contracts elastically; and the baffle comprises a shield section and a rim section when the baffle is positioned adjacent to a gear, the shield section has a first length that is radial with respect to the gear, the rim section has a second length that is axial with respect to the gear;

the rim section comprises a first wall and a second wall;

the second wall extends at first angle from the first wall;

the second wall extends at second angle from the rim section; and the second wall is curved, connected to, and continuous with the rim section.

\* \* \* \* \*